(12) United States Patent
Choi

(10) Patent No.: US 9,816,469 B2
(45) Date of Patent: Nov. 14, 2017

(54) INTAKE SYSTEM

(71) Applicant: Hyundai Motor Company, Seoul (KR)

(72) Inventor: Won Rok Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 14/821,410

(22) Filed: Aug. 7, 2015

(65) Prior Publication Data

US 2016/0146166 A1 May 26, 2016

(30) Foreign Application Priority Data

Nov. 26, 2014 (KR) ........................ 10-2014-0166790

(51) Int. Cl.
| | |
|---|---|
| *F02M 35/104* | (2006.01) |
| *F02B 29/04* | (2006.01) |
| *F02M 35/10* | (2006.01) |
| *F02M 35/112* | (2006.01) |

(52) U.S. Cl.
CPC ....... *F02M 35/104* (2013.01); *F02B 29/0406* (2013.01); *F02M 35/1045* (2013.01); *F02M 35/10268* (2013.01); *F02M 35/112* (2013.01); *Y02T 10/146* (2013.01)

(58) Field of Classification Search
CPC .......... F02M 35/104; F02M 35/10268; F02M 35/1045; F02M 35/112; F02B 29/0406
USPC .................................................... 123/184.47
See application file for complete search history.

(56) References Cited

U.S. PATENT DOCUMENTS

| | | | |
|---|---|---|---|
| 5,448,982 A | | 9/1995 | Arakawa et al. |
| 5,551,387 A | * | 9/1996 | Carter .................... F02M 35/10 123/184.47 |
| 6,955,149 B1 | * | 10/2005 | Christie .............. F02B 27/0252 123/184.36 |
| 9,038,609 B2 | * | 5/2015 | Meshenky .......... F02B 29/0462 123/184.21 |
| 2013/0133630 A1 | * | 5/2013 | Watanabe ........ F02M 35/10262 123/527 |
| 2013/0180507 A1 | * | 7/2013 | Nakasugi ............ F02B 29/0437 123/542 |

FOREIGN PATENT DOCUMENTS

| | | |
|---|---|---|
| JP | 2011-190744 A | 9/2011 |
| KR | 10-2007-0023084 A | 2/2007 |
| KR | 10-2012-0062095 A | 6/2012 |
| KR | 10-2014-0076218 A | 6/2014 |
| WO | WO 2008/108234 A1 | 9/2008 |

* cited by examiner

*Primary Examiner* — Carlos A Rivera
*Assistant Examiner* — Anthony Taylor, Jr.
(74) *Attorney, Agent, or Firm* — Morgan, Lewis & Bockius LLP

(57) ABSTRACT

An intake system may include an intercooler configured to cool an air supplied to an engine, and an intake manifold configured to supply the air which is passed through the intercooler into at least one cylinder, and having a first runner and a second runner, in which the air which is exhausted from the intercooler is selectively supplied into at least one of the first runner and the second runner, and at least one cylinder which is communicated with the first runner is separated from at least one cylinder which is communicated with the second runner.

17 Claims, 5 Drawing Sheets

INTAKE SYSTEM

CROSS-REFERENCE TO RELATED APPLICATION

The present application claims priority to Korean Patent Application No. 10-2014-0166790 filed Nov. 26, 2014, the entire contents of which is incorporated herein for all purposes by this reference.

BACKGROUND OF THE INVENTION

Field of the Invention

The present invention relates to an intake system. More particularly, the present invention relates to an intake system which is configured to feed air into each cylinder through branched passages of the intake manifold by controlling air supplied into intake manifold by an air control valve.

Description of Related Art

In general, a diesel engine is provided with a turbo charger and an intercooler to obtain high output. The diesel engine with a turbo charger receives more external air by a compressor.

At this time, the external air received is compressed at a high temperature by heat generated in the compression process. Because this compressed air of high temperature ("supercharged air") has a low density, the charging efficiency of an engine drops when the supercharged air is supplied into the engine.

Therefore, the engine may be provided with an intercooler to cool the supercharged air or to increase the density.

The intercooler is classified into an air-cooling intercooler and a water-cooling intercooler. The air-cooling intercooler is designed as a similar structure to that of a radiator. That is, the air-cooling intercooler cools the supercharged air that is supplied into the engine by using an air flowed while the vehicle is running. The water-cooling intercooler is an apparatus which cools the supercharged air using a coolant. Thus, the water-cooling intercooler has a merit of a higher responsiveness and cooling efficiency than the air-cooing intercooler.

A cooled air that is passed through the intercooler is supplied to the engine via an intake manifold.

The intake manifold can be integrally formed with the intercooler. The intake manifold formed integrally with intercooler has a merit of high cooling efficiency because the cooled air is directly supplied to the engine passing through the intake manifold. However, this intake manifold which is formed integrally with intercooler has a problem of an intake interference, because the intake manifold is communicated with all the cylinders, and it is difficult to supply the air to each cylinder equally.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an intake system having advantages of improving a cooling performance and efficiency by controlling the flow rate or the path of an air by an air control valve in accordance with an ignition order of each cylinder and passing the air through a separate path to each cylinder.

According to various aspects of the present invention, an intake system may include an intercooler configured to cool an air supplied to an engine, and an intake manifold configured to supply the air which is passed through the intercooler into at least one cylinder, and having a first runner and a second runner, in which the air which is exhausted from the intercooler is selectively supplied into at least one of the first runner and the second runner, and at least one cylinder which is communicated with the first runner is separated from at least one cylinder which is communicated with the second runner.

The intercooler may be a water-cooling intercooler configured to cool the air by exchanging heat with coolant.

The intake system may further comprise an air control valve that is positioned at an upstream side of the intercooler and controls the air which is supplied into the intercooler, and an air line that feeds the air into the air control valve, and supplies the air which is exhausted from the air control valve into the intake manifold.

The first runner and the second runner may be symmetric in a length direction of the air line, respectively.

The intercooler may include a first air line so as to be in fluid communication with the first runner, a second air line to be in fluid communication with the second runner, and a partition which is provided for separating air passing through the first air line and the second air line.

The air passing through the air control valve may be to be supplied into the first air line or the second air line selectively.

The air control valve may include a control housing and a control board, the control housing may configured to be disposed in an inner side of the air line so as to fix the control board, and the control board may be formed in such a shape that the air is blocked to pass therethrough inside of the air line.

The control housing may be formed in a ring shape, the control board may be formed in a half circle board shape.

When the control board is configured to revolve in a clockwise or an anticlockwise direction in order to change a position, the first air line or the second air line may be configured to be blocked selectively.

The intake system may further include a controller configured to control the control board in accordance with a rotation speed or an ignition order of the engine, and a sensor device configured to send information of the rotation speed or the ignition order of the engine to the controller.

When the rotation speed of the engine is lower than a predetermined speed and an ignition occurs in the cylinder which is communicated with the first runner, the controller may be configured to control the control board to be rotated so that the second air line is cut off.

When the rotation speed of the engine is lower than a predetermined speed and an ignition occurs in the cylinder which is communicated with the second runner, the controller is configured to control the control board to be rotated so that the first air line is cut off.

When the rotation speed of the engine exceeds a predetermined speed, the controller may be configured to control the control board to be rotated so that the first air line and the second air line are opened.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
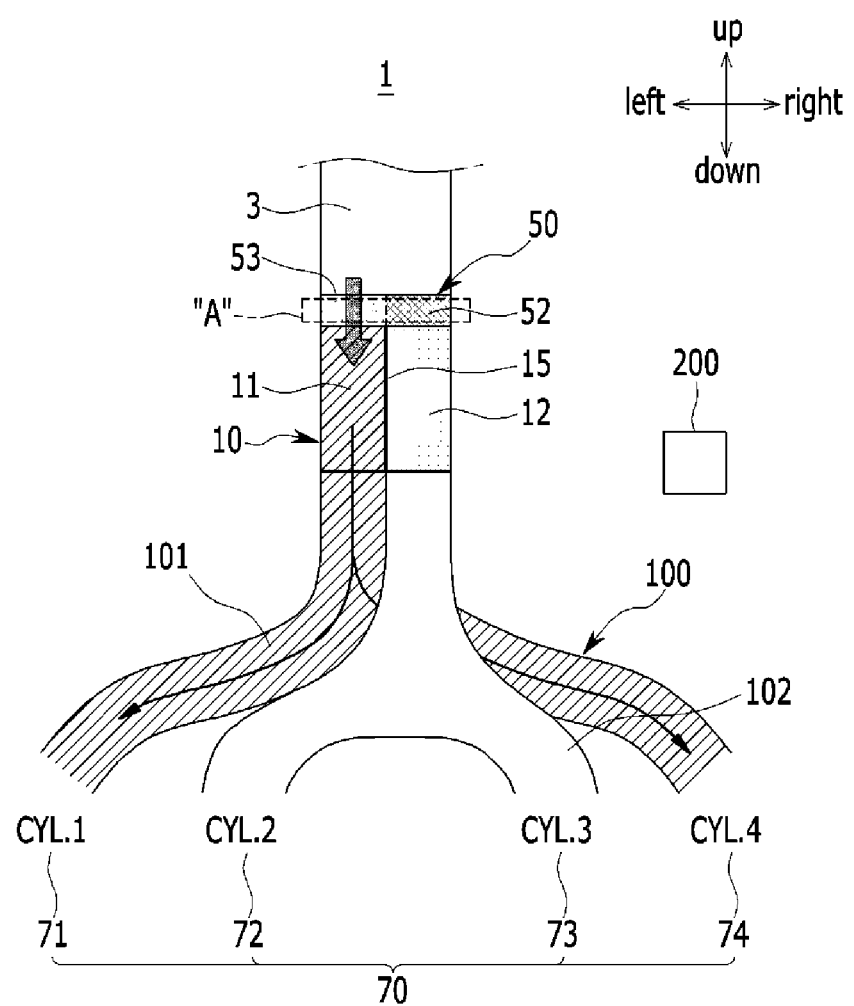
FIG. 1 is a schematic diagram illustrating an air supplied into a first runner in a low-speed section according to the present invention.
Figure 2:
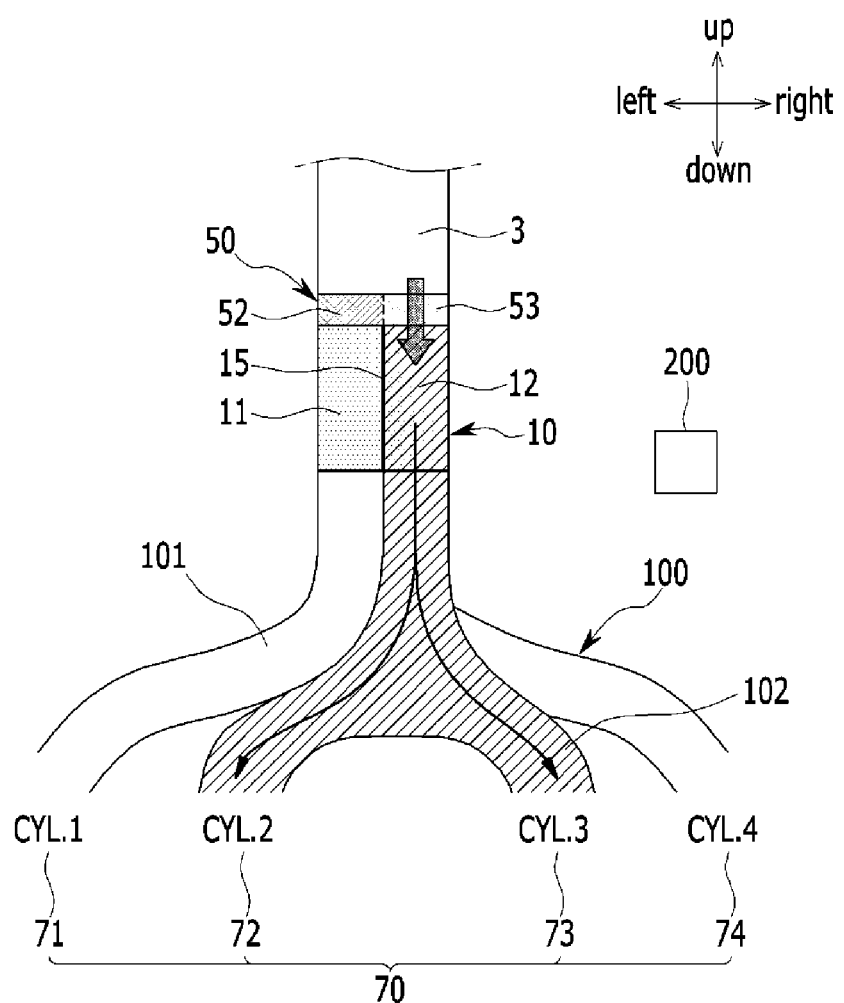
FIG. 2 is a schematic diagram illustrating an air supplied into a second runner in a low-speed section according to the present invention.
Figure 3:
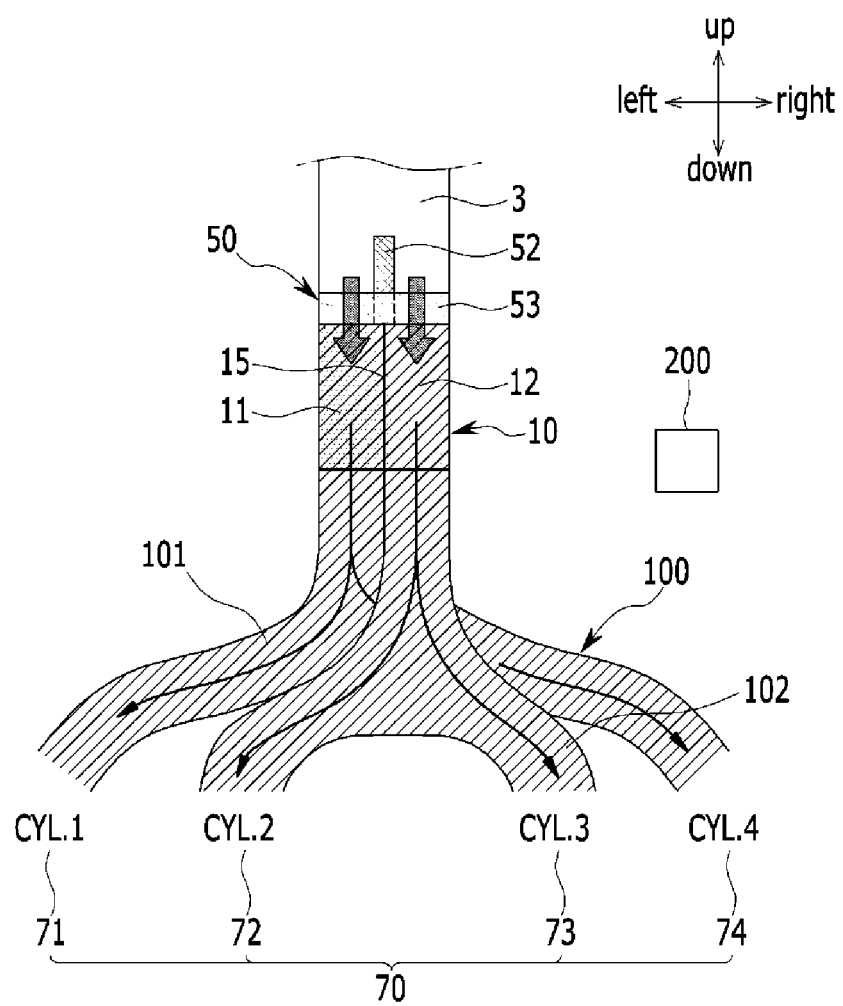
FIG. 3 is a schematic diagram illustrating an air supplied into a first runner and a second runner in a high-speed section according to the present invention.
Figure 4:
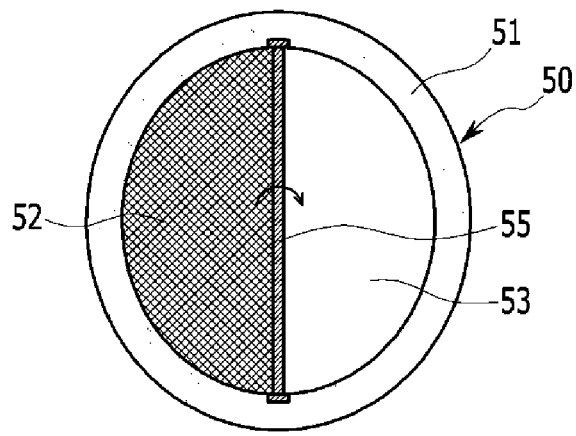
FIG. 4 is a cross-sectional view of a portion "A" of FIG. 1, which is a cross-sectional view of an air control valve according to the present invention.

FIG. 1 is a schematic diagram illustrating an air supplied into a first runner in a low-speed section according to various embodiments of the present invention, FIG. 2 is a schematic diagram illustrating an air supplied into a second runner in a low-speed section according to various embodiments of the present invention, FIG. 3 is a schematic diagram illustrating an air supplied into a first runner and a second runner in a high-speed section according to various embodiments of the present invention, and FIG. 4 is a cross-sectional view of a portion "A" of FIG. 1, which is a cross-sectional view of an air control valve according to various embodiments of the present invention.

As shown in FIG. 1 to FIG. 3, an intake system 1 according to various embodiments of the present invention is configured to control a flow rate or a path of an air supplied to each cylinder. The intake system 1 includes an air control valve 50, an intercooler 10, an intake manifold 100 and a controller 200. The air control valve 50, the intercooler 10, and intake manifold 100 are connected by an air line 3.

The air control valve 50 controls a path of the air which is supplied into the intercooler 10 in accordance with an ignition order. As illustrated in FIG. 4, the air control valve 50 includes a control housing 51, a control board 52, and an opening portion 53.

The control housing 51 is formed along a circumference of the inside surface of the air line 3. A cross-sectional shape of the control housing 51 substantially corresponds to that of the air line 3. That is, if the cross-sectional shape of air line 3 is formed in a circle shape, the control housing 51 may be formed in a ring shape, but is not limited thereto. The control board 52 is formed in a shape that is half of the control housing 51, and is coupled to an inside of the control housing 51 to be rotatable. If the cross-sectional shape of control housing 51 is formed in a ring shape, the control board 52 may be formed in a half circle shape, but is not limited thereto. The control board 52 may be in any shape so that a part of an inner side of the control housing 51 is closed selectively. The control board 52 is configured to block the air. The opening portion 53 is formed in such a shape that the air is allowed to pass therethrough as it is opened upward and downward in the drawing. Thus, as shown in FIG. 1, if the air is flowed in a lower direction, the air is configured to pass through the opening portion 53 and is blocked to pass through the control board 52.

A base portion 55 is coupled with the control board 52 to pass a center of the control housing 51. The base portion 55 may be integrally formed with the control board 52, and the respective ends of the base portion 55 may be coupled with the inner side of the control house 51. The control board 52 may be fixed by the base portion 55 so as to rotate clockwise or anticlockwise with reference to the base portion 55. As such, the control board 52 is rotated and therefore the control board 52 and the opening portion 53 can be changed of a position each other.

Meanwhile, when the control board 52 is rotated, the other side of the control board 52 is configured to selectively contact with an interior surface in a left or right side in the drawing. If the other side of the control board 52 is revolved and contacted with an interior surface in the right side, then a right side of the air line 3 is blocked. Thus, the air inflows to the intercooler 10 via the right side of the opening portion 53 that is not covered by the control board 52. If the other end of the control board 52 is revolved and contacted with an interior surface in the left side, then a left side of the air line 3 is blocked. Thus, the air inflows to the intercooler 10 via the left side of the opening portion 53 that is not covered by the control board 52.

The intercooler 10 is configured to cool the air which is supplied from the air control valve 50, and feeds the cooled air into the intake manifold 100. The intercooler 10 may be a water-cooling intercooler configured to cool an air by exchanging heat with coolant, but is not limited thereto. The intercooler 10 is provided with a partition 15 corresponding to the base portion 55 in a vertical direction in the drawing. The air which is supplied into the intercooler 10 may be separated by the partition 15.

The intercooler 10 may be provided with a first air line 11 disposed leftward and a second air line 12 disposed rightward with reference to the partition 15.

The first air line 11 or the second air line 12 may selectively receive or not receive the air from the air control valve 50. That is, if the control board 52 blocks the left side of the air line 3, then the air passed through the air control valve 50 is configured to be flowed the second air line 12. And, if the control board 52 blocks the right side of the air line 3, then the air passed through the air control valve 50 is configured to be supplied into the first air line 11.

The intake manifold 100 is configured to supply the air passed through the intercooler 10 into each cylinder 70. The intake manifold 100 includes the first runner 101, the second runner 102. The first runner 101 is configured to be connected with the first air line 11, and exhaust the air supplied from the first air line 11 into at least one cylinder 70. The second runner 102 is configured to be connected with the second air line 12, and exhaust the air supplied from the second air line 12 into at least one cylinder 70. As shown in FIG. 1, the first runner 101 may be communicated with a first cylinder 71 and a fourth cylinder 74. And at the same time, the second runner 102 may be communicated with a second cylinder 72 and a third cylinder 73.

Meanwhile, the first runner 101 and the second runner 102 may be symmetric in a length direction of the air line 3. Therefore, the air passed through the first runner 101 or the second runner 102 may be supplied into each cylinder 70 equally.

The intake system 1 further includes a controller 200 to control an amount of a rotation of the control board 52. The controller 200 can be realized by one or more processors activated by a predetermined program.

Figure 5:
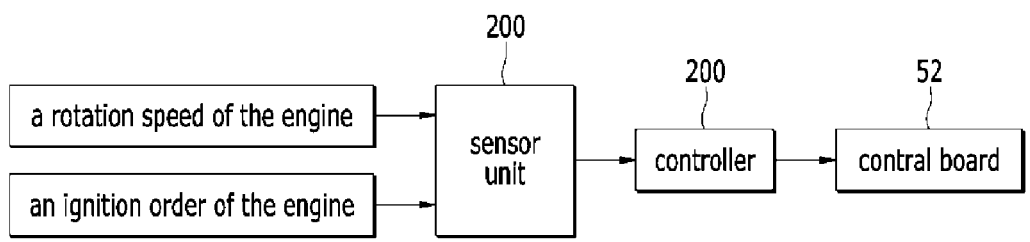
FIG. 5 is a block diagram of an exemplary intake system according to the present invention.

FIG. 5 is a block diagram of an intake system according to various embodiments of the present invention.

As shown in FIG. 5, the intake system 1 further includes a sensor device 150. The sensor device 150 is configured to sense a rotation speed or the ignition order of the engine.

The controller 200 controls the rotation amount of the control board 52 on the basis of information which is transmitted by sensor device 150 such as the rotation speed or the ignition order of the engine.

In a following description, when the rotation speed of the engine is lower than a predetermined speed, it is referred to as a low-speed section. And when the rotation speed of the engine exceeds the predetermined speed, it is referred to as a high-speed section.

FIG. 1 indicates the intake system 1 when an ignition is occurred in the cylinder 70 which is communicated with the first runner 101 during the low-speed section of the engine. In this instance, the controller 200 rotates the control board 52, so that the second air line 12 is cut off. Therefore, the air is delivered to the first air line 11 passing through the opening portion 53. And, the air passing through the first air line 11 is supplied into the first, the fourth cylinder 71, 74 respectively via the first runner 101.

FIG. 2 indicates the intake system 1 when an ignition is occurred in the cylinder 70 which is communicated with the second runner 102 during the low-speed section of the engine. In this instance, the controller 200 rotates the control board 52, so that the first air line 11 is cut off. Therefore, the air is delivered to the second air line 12 passing through the opening portion 53. And, the air passing through the second air line 12 is supplied into the second, the third cylinder 72, 73 respectively via the second runner 102.

As described above, the air may be selectively supplied to the first runner 101 or the second runner 102 separately in accordance with an ignition order of each cylinder 70 during the low-speed section of the engine. Therefore, the engine efficiency can be equal to the conventional art despite relatively a small amount of an air. In detail, in a conventional intake system, an air should be supplied to all the cylinders 70 such as the first, second, third, and fourth cylinders 71, 72, 73, and 74. However, according to a present invention, the air could be supplied only to the first and fourth cylinders 71, 74 or the second and third cylinders 72, 73. Since the first runner 101 and the second runner 102 are separated, a flow interference at the intake manifold 100 may be moderated. Further, as the amount of the air is reduced, efficiency of the intercooler 10 may be improved.

FIG. 3 indicates the intake system 1 during the high-speed section of the engine.

The controller 200 controls the control board 52 to be positioned in a length direction of the air line 3. That is, the control board is configured to be in an upward and downward direction. Therefore, the air can be passed through the opening portion 53 which is formed both sides of the air line 3. And the air passed through the opening portion 53 is supplied to all the cylinders 70 via the first runner 101 and the second runner 102 being guided by the first air line 11 and the second air line 12. For example, the air may be supplied into the first, the second, the third, and the fourth cylinders 71, 72, 73, 74. Accordingly, during the high-speed section, the amount of the air may be sufficiently supplied, and an output of the engine can be improved.

As described above, according to various embodiments of the present invention, the air control valve 50 controls the flow rate or the path of the air in accordance with the ignition order or the rotation speed of the engine. The flow rate of the air configured to be flowed into each cylinder 70 based on a condition of the engine. That is, when the rotation speed of the engine is lower than the predetermined speed, the air passing through the air control valve 50 is reduced. And thereby the cooling efficiency by the intercooler 10 may be improved.

Also, the intake interference may be minimized and the intake efficiency of each cylinder 70 may be improved as the air which is supplied into the intake manifold 100 is fed into each cylinder 70 through the separated passage.

Furthermore, if the intake efficiency of each cylinder 70 is improved, there are effects of cutting fuel consumption.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intake system, comprising:
    an intercooler configured to cool an air supplied to an engine;
    a partition formed in the intercooler so as to separate an interior of the intercooler into two parts; and
    an intake manifold configured to supply the air which is passed through the intercooler into at least one cylinder, and having a first runner connected to only a first one of the two parts and a second runner connected to only a second one of the two parts, wherein the air which is exhausted from the intercooler is selectively supplied into at least one of the first runner and the second runner, and wherein the air which is exhausted from the intercooler to the at least one cylinder via the first runner is separated from the air which is exhausted from the intercooler to at least one other cylinder via the second runner by the partition.

2. The intake system of claim 1, wherein the intercooler is a water-cooling intercooler configured to cool the air by exchanging heat with coolant.

3. The intake system of claim 1, further comprising:
an air control valve that is positioned at an upstream side of the intercooler and controls the air which is supplied into the intercooler; and
an air line that feeds the air into the air control valve, and supplies the air which is exhausted from the air control valve into the intake manifold.

4. The intake system of claim 3, wherein the air control valve includes a control housing and a control board,
the control housing is configured to be disposed in an inner side of the air line so as to fix the control board, and
the control board is formed in a shape that the air is blocked to pass therethrough inside of the air line.

5. The intake system of claim 4, wherein the control housing is formed in a ring shape, and
the control board is formed in a half circle shape.

6. The intake system of claim 4, wherein when the control board is configured to revolve in a clockwise or an anticlockwise direction in order to change a position thereof, a first air line or a second air line is configured to be blocked selectively.

7. The intake system of claim 6, further comprising:
a controller configured to control the control board in accordance with a rotation speed or an ignition order of the engine; and
a sensor device configured to send information of the rotation speed or the ignition order of the engine to the controller.

8. The intake system of claim 1, wherein the first runner and the second runner are symmetric in a length direction of the air line, respectively.

9. The intake system of claim 1, wherein the intercooler includes:
a first air line so as to be in fluid communication with the first runner;
a second air line so as to be in fluid communication with the second runner; and
wherein the partition is provided so as to separate air passing through the first air line and the second air line.

10. The intake system of claim 9, wherein the air passing through an air control valve from an air line is configured to be supplied into the first air line or the second air line selectively.

11. The intake system of claim 10, wherein the air control valve includes a control housing and a control board,
the control housing is configured to be disposed in an inner side of the air line so as to fix the control board, and
the control board is formed in a shape that the air is blocked to pass therethrough inside of the air line.

12. The intake system of claim 11, wherein the control housing is formed in a ring shape, and the control board is formed in a half circle shape.

13. The intake system of claim 12, wherein when the control board is configured to revolve in a clockwise or an anticlockwise direction in order to change a position thereof, the first air line or the second air line is configured to be blocked selectively.

14. The intake system of claim 13, further comprising:
a controller configured to control the control board in accordance with a rotation speed or an ignition order of the engine; and
a sensor device configured to send information of the rotation speed or the ignition order of the engine to the controller.

15. The intake system of claim 14, wherein the controller is configured to control the control board to be rotated so that the second air line is cut off, in accordance with when the rotation speed of the engine is lower than a predetermined speed and an ignition occurs in the at least one cylinder which is communicated with the first runner.

16. The intake system of claim 14, wherein the controller is configured to control the control board to be rotated so that the first air line is cut off, in accordance with when the rotation speed of the engine is lower than a predetermined speed and an ignition occurs in the at least one cylinder which is communicated with the second runner.

17. The intake system of claim 14, wherein the controller is configured to control the control board to be rotated so that the first air line and the second air line are opened, in accordance with when the rotation speed of the engine exceeds a predetermined speed.

* * * * *